(12) United States Patent
Rossi

(10) Patent No.: US 8,474,835 B1
(45) Date of Patent: Jul. 2, 2013

(54) MOBILE SUPPORT CART FOR ADJUSTABLE HOLDING EQUIPMENT

(76) Inventor: Remo J. Rossi, Sterling, MA (US)

( * ) Notice: Subject to any disclaimer, the term of this patent is extended or adjusted under 35 U.S.C. 154(b) by 261 days.

(21) Appl. No.: 12/925,569

(22) Filed: Oct. 25, 2010

(51) Int. Cl.
*B62B 3/00* (2006.01)

(52) U.S. Cl.
USPC ............. 280/47.35; 280/79.11; 280/79.3

(58) Field of Classification Search
USPC ............. 280/47.34, 47.35, 35, 651, 79.2, 280/79.3, 79.7, 79.11; 248/125.2, 123.2, 248/331, 332
See application file for complete search history.

(56) References Cited

U.S. PATENT DOCUMENTS

| | | | |
|---|---|---|---|
| 4,625,731 A * | 12/1986 | Quedens et al. | 600/443 |
| 4,976,450 A * | 12/1990 | Ellefson | 280/79.11 |
| 5,924,988 A * | 7/1999 | Burris et al. | 600/437 |
| 6,286,794 B1 * | 9/2001 | Harbin | 248/123.2 |
| 6,493,220 B1 * | 12/2002 | Clark et al. | 361/679.41 |
| 6,626,445 B2 | 9/2003 | Murphy et al. | |
| 6,639,789 B2 * | 10/2003 | Beger | 606/46 |
| 6,851,851 B2 * | 2/2005 | Smith et al. | 378/189 |
| 7,074,180 B2 | 7/2006 | Bertolero et al. | |
| 7,204,348 B2 * | 4/2007 | Bloch et al. | 187/406 |
| 7,352,570 B2 | 4/2008 | Smith et al. | |
| 7,815,202 B2 * | 10/2010 | Richards et al. | 280/79.7 |
| 8,240,684 B2 * | 8/2012 | Ross et al. | 280/47.34 |
| 2005/0062238 A1 * | 3/2005 | Broadfield et al. | 280/1 |
| 2010/0163694 A1 * | 7/2010 | Fadler et al. | 248/125.2 |
| 2011/0042911 A1 * | 2/2011 | Kozlowski et al. | 280/47.35 |
| 2011/0306864 A1 * | 12/2011 | Zarate et al. | 600/407 |

* cited by examiner

*Primary Examiner* — Katy M Ebner
*Assistant Examiner* — Emma K Frick
(74) *Attorney, Agent, or Firm* — Stan Collier, Esq.

(57) ABSTRACT

A mobile support cart has one or more extendable and foldable arms to position one or more monitors or devices mounted to the extendable arm. The arm is mounted to a vertical column that is supported by a linear rail system providing vertical guidance. An adjustable counterweight carriage rides on a second rail set and is connected to each column through a chain and pulley. Each chain and pulley is fully redundant with two chains attached to discrete mounting points on each counterweight carriage and to each column. The amount of counterweight applied can be adjusted within a given load range by adding additional plates/ballast to the counterweight carriage. When the load on the arm(s) are fully offset by ballast on the counter weight carriage the arms and payloads reach a "neutral buoyancy" condition. The system maintains the position once an operator has released them.

2 Claims, 5 Drawing Sheets

MOBILE SUPPORT CART FOR ADJUSTABLE HOLDING EQUIPMENT

CROSS REFERENCES TO RELATED APPLICATIONS

NA

REFERENCE TO FEDERALLY SPONSORED RESEARCH OR DEVELOPMENT

NA

REFERENCE TO JOINT RESEARCH AGREEMENTS

NA

REFERENCE TO SEQUENCE LISTING

NA

BACKGROUND OF THE INVENTION

1. Field of the Invention

The present invention relates generally to mobile devices for holding equipment, and, in particular, relates mobile devices for adjustably holding equipment for use by an adjacent user, and, in greater particularity, relates to mobile support devices for holding monitors and related equipment thereon for use in the medical field.

2. Description of the Prior Art

In today's high technology age, the use of monitors has become a necessity in many areas. Video monitors are used to present information rapidly to a nearby user.

The simplest device for holding a monitor is a utility cart that normally has multiple shelves with lockable wheels on the four corners of the cart. For example, a common utility cart may be used for moving a television from room to room in a school. Additional equipment such as VCRs can be located under the top shelf. Further the "utility cart" can be modified to hold other equipment such as shown by U.S. Pat. Nos. 6,626,445 and 7,352,570 where the monitor is mounted to or on the top surface.

In a laboratory, the workspace such as a bench may not have sufficient space for numerous pieces of test equipment and thus multiple carts would be required. This presents problems on positioning each cart and the wires necessary for operating the test equipment.

In order to minimize the number of carts nearby, equipment may be connected to a common monitor with controls thereon to be able to select which piece of equipment to view. The common monitor may be placed on a separate utility cart so that it can be moved to the most convenient location. Even this solution may not be acceptable such as in an operating room where multiple people are attending to the patient and moving about the operating table. Wires whether electrical or data present a tripping hazard as well as a distraction when trying to move around. One possible solution is to mount to the ceiling as much of the equipment as possible and having adjustable arms holding monitors. Other possible solutions are shown by U.S. Pat. No. 7,074,180 where a monitor can be mounted to a stand near the operating table, where the monitor is mounted on an arm attached to the operating table or where the monitor is mounted to a foldable and extendable arm from a cart such as shown in the above patent. As new devices become available or special devices required, carts may still be used.

Accordingly, there is an established need for a mobile support for equipment having a monitor for output that provides flexibility in positioning of the monitor near an operating table, for example.

SUMMARY OF THE INVENTION

The present invention is directed at a mobile cart for use with multiple monitors.

The present invention is a mobile support cart with one or more extendable and foldable arms with vertical adjustment to position one or more monitors or devices mounted to the extendable arm in close proximity to viewers. The arm is mounted to a vertical column that is supported and guided by a linear rail system providing vertical guidance and also having an adjustable counterweight carriage riding on a second rail set for guidance and is connected to each vertical column through a chain and pulley system. Each chain and pulley system is fully redundant with two chains attached to discrete mounting points on each carriage. The amount of counterweight applied can be easily adjusted within a given load range by adding additional plates/ballast to the counterweight carriage. When the load on the arm(s) are fully offset by ballast on the counterweight carriage the arms and payloads such as monitors reach a "neutral buoyancy" condition and can easily be positioned vertically with minimal force. There is sufficient friction and damping in the system to maintain the position of monitors and devices once an operator has released them. A pair of arms provides flexible means for mounting multiple monitors or support devices. The cart further has a plurality of adjustable shelves for holding support equipment.

An object of the present invention is to provide a device for positioning viewing means such as monitors in close proximity to a viewer.

It is another object of the present invention to provide a device having means to hold multiple monitors.

It is a further object of the present invention to provide a mobile support cart having adjustable arms for holding the viewing means.

It is still a further object of the present invention to provide a mobile support cart wherein the viewing means is movable in three degrees of freedom.

It is still a further object of the present invention to provide a mobile support cart wherein the viewing means is movable in three degrees of freedom, and, in particular, in the vertical direction through the use a linear rail system having a counterweight system providing "neutral buoyancy".

It is yet a further object of the present invention to provide a mobile support cart having viewing means thereon as well as locations for holding other or related equipment.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION OF THE PREFERRED EMBODIMENTS

The present invention is directed at a mobile support system having a cart with one or more adjustable arms thereon wherein the vertical distance may range from 2 to 4 feet.

Figure 1:
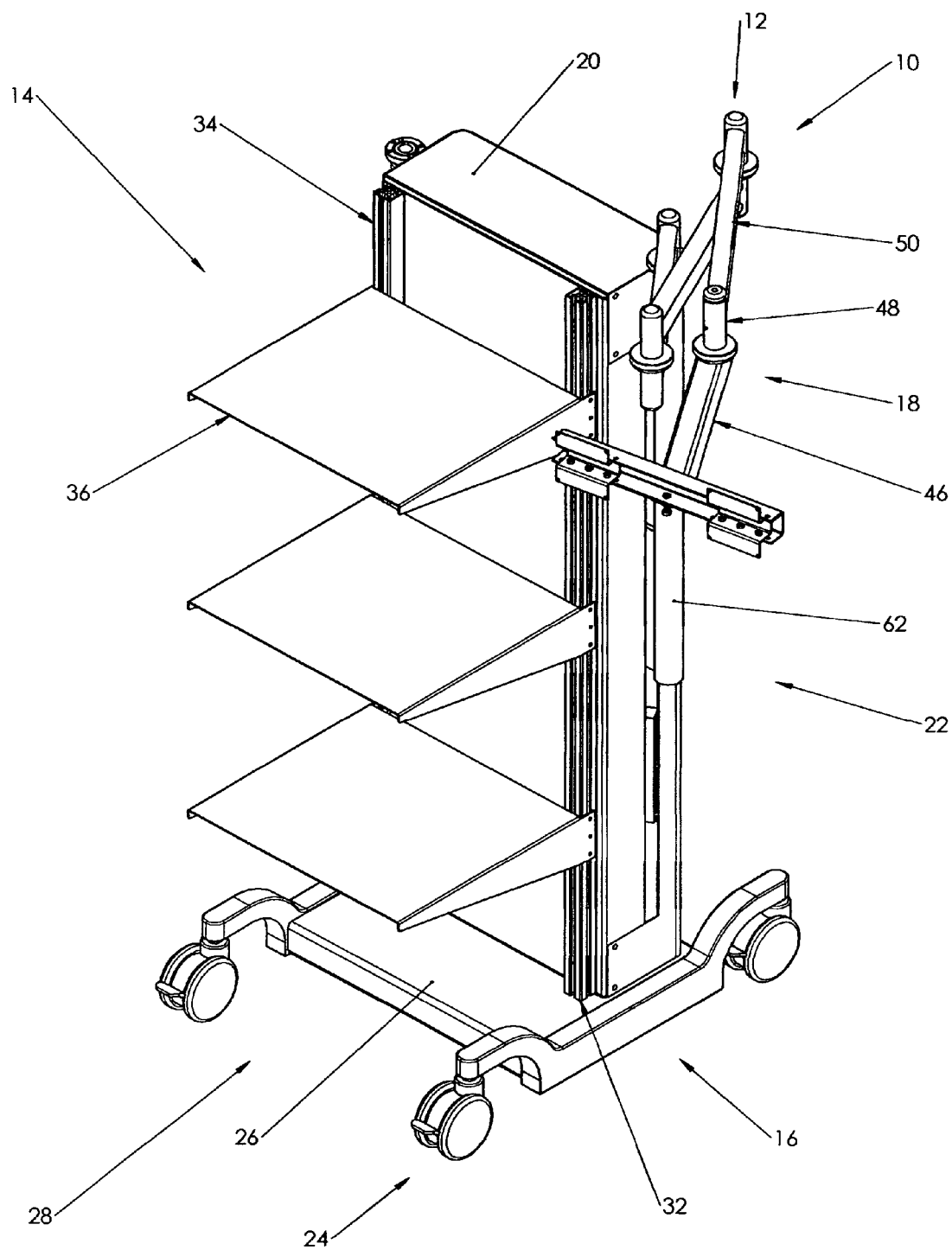
FIG. 1 is a front-side perspective view of a mobile support cart of a preferred embodiment of the present invention.

Turning to the drawings, wherein like components are designated by like reference numerals throughout the various figures, attention is initially directed to FIG. 1 which illustrates by a perspective view a mobile support cart 10 according to the present invention.

Figure 4:
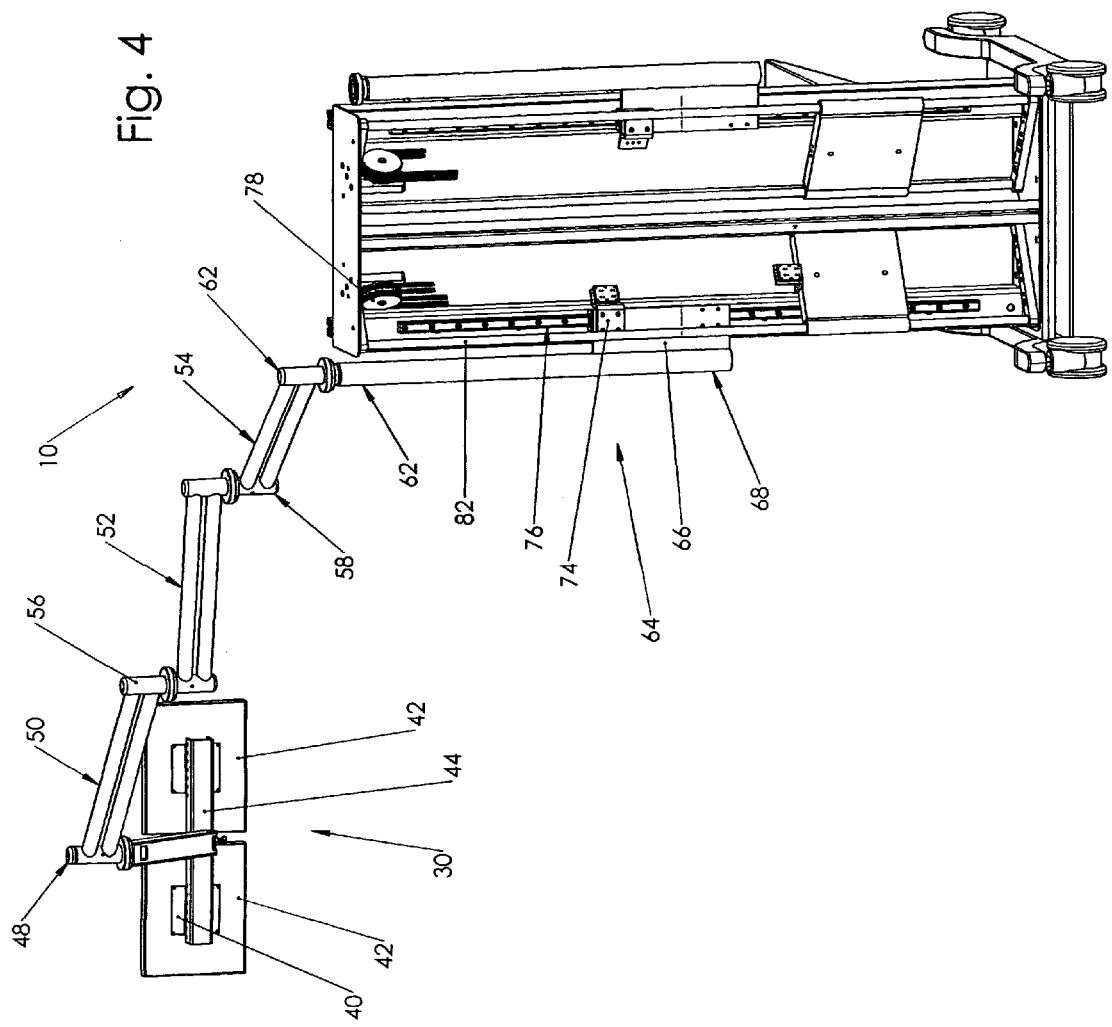
FIG. 4 is a back perspective view of the mobile support cart of FIG. 2 showing one of the support arms extended with monitors thereon of the present invention.

As best shown in FIG. 1, the mobile support cart 10 has one or more extendable arms 12, only one shown, connected to a linear rail system and a counterweight system 22, only partially shown, a plurality of adjustable shelves 14, a lower frame 16, and an upper frame 18. FIG. 4 is an exploded view of the mobile support cart 10 showing the parts therein.

Figure 2:
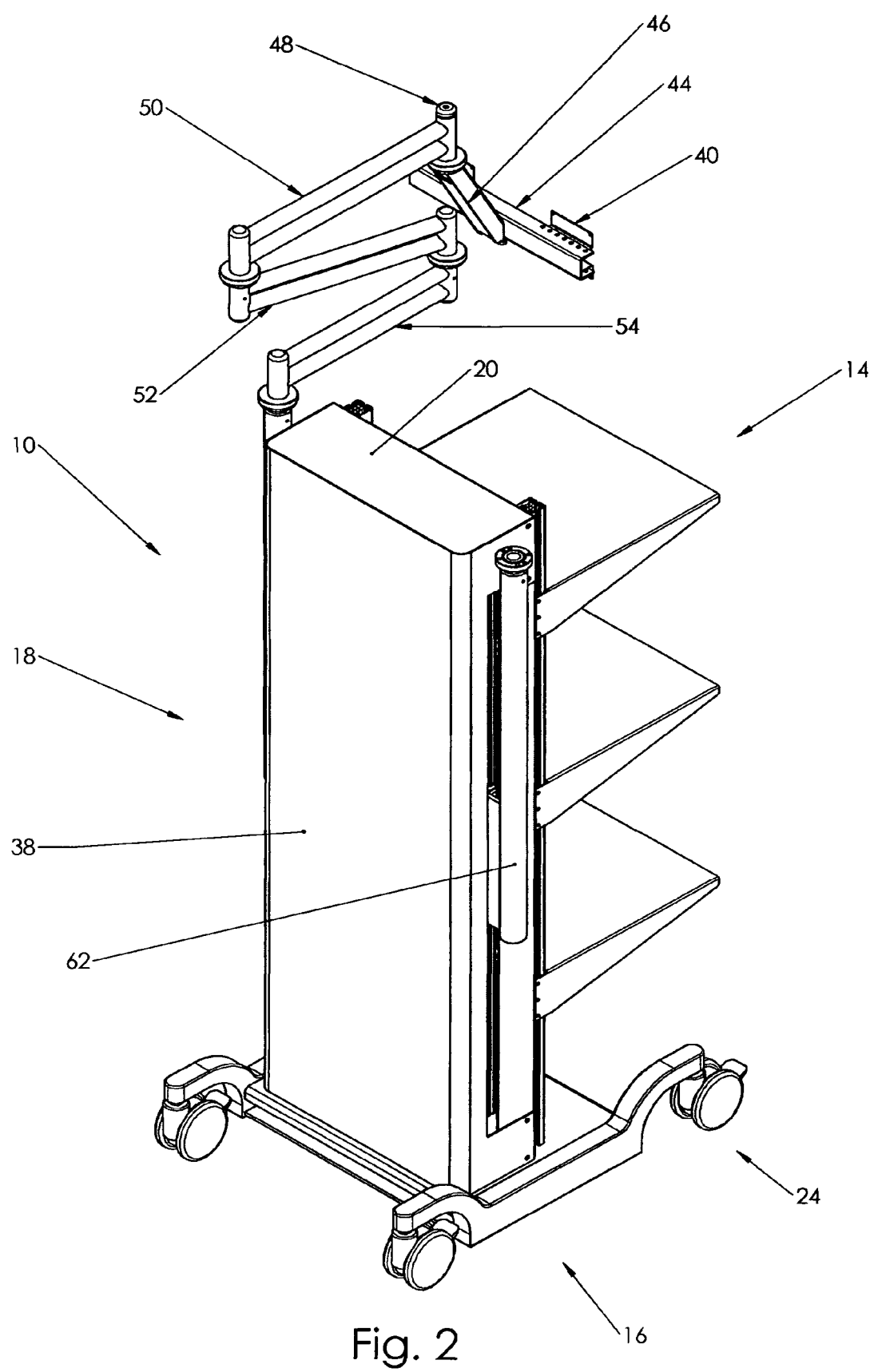
FIG. 2 is a backside perspective view of the mobile support cart of FIG. 1 of the present invention.
Figure 5:
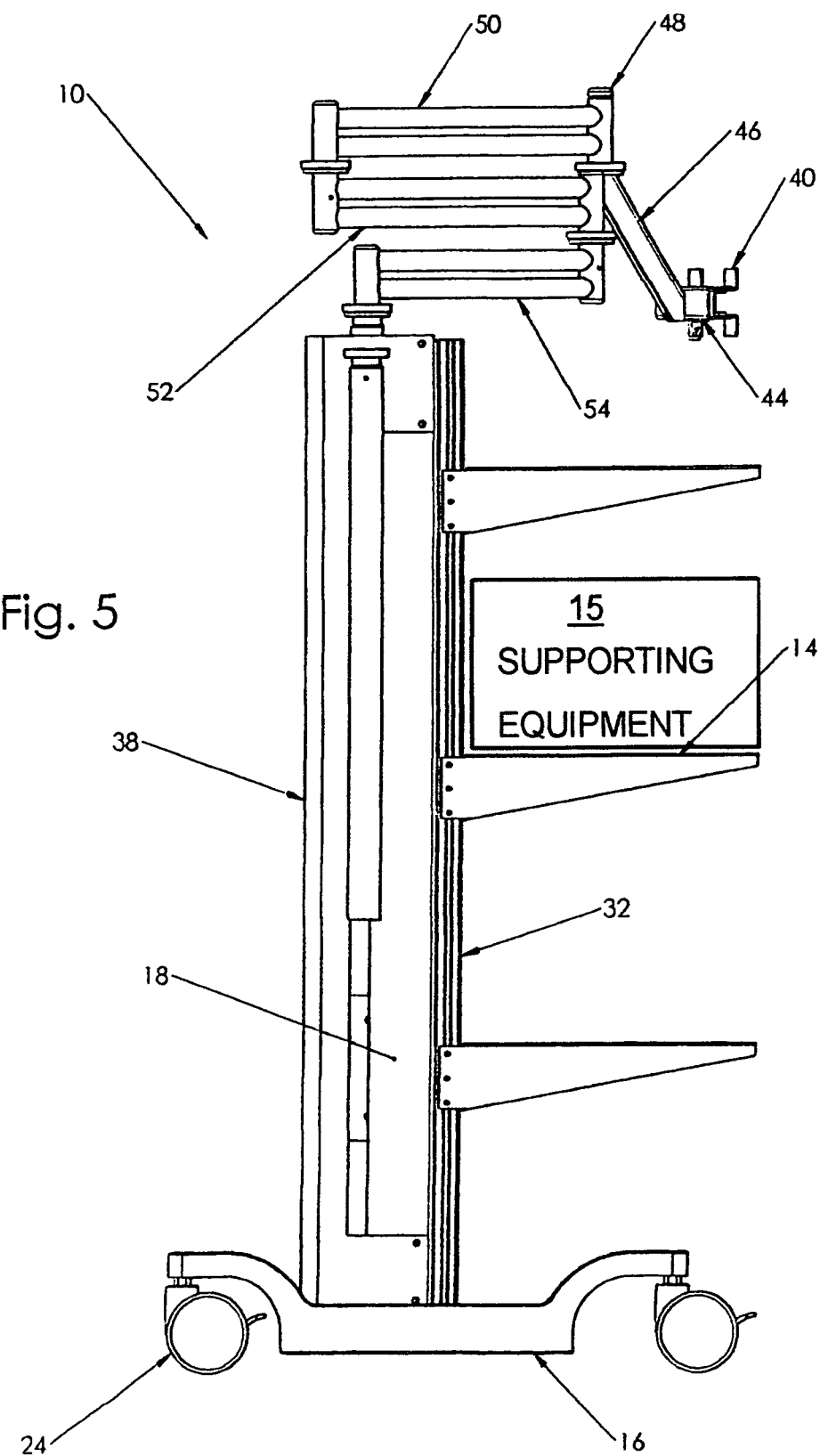
FIG. 5 is a side view of the mobile support cart of FIG. 1 of the present invention.

The mobile support cart 10 has the upper frame 18 attached to the lower frame 16 by conventional means such as welding or screws and bolts, and the upper frame 18 is a box-like structure 20 in which the linear rail system and counterweight system 22 is mostly enclosed to prevent injuries from moving parts therein. The interior of the box-like structure 20 is exposed when a frame cover 38 is removed, FIG. 2. The lower frame 16 has a plurality of lockable wheels 24 attached thereto with a platform 26 therebetween. The platform 26 includes ballast weight 28, not shown, to prevent tip over of the cart 10 when the one or more arms 12 are extended with one or more pieces of attached equipment 30 thereon, FIG. 4. Further a vertical column 62 moves opposite to a counterweight 80 to minimize the center of gravity above a floor. The mobile support cart 10 has a rectangular foot print with sides approximately between 2 and 4 feet length and a height of about 5 feet. FIG. 5. The adjustable shelves 14 are attached to a pair of vertical tracks 32 and 34 attached to the upper frame 18. The front edge 36 of the shelf 14 is lifted to allow the shelf to be moved within the tracks 32,34. The shelves 14 would hold supporting equipment 15 not shown. In order to minimized attached wires, a common electrical outlet for power may be further mounted to the lower or upper frame 16, 18. The mobile support cart 10 is operatively designed to be used in an examination and/or operating room where occupied space of equipment must be minimized.

The attached equipment 30, FIG. 4, is normally mounted to a bracket 40, one shown in the figures for mounting two monitors 42, for example. The bracket 40 is mounted to a rail 44. Rail 44 is further mounted to a supporting arm 46 and supporting arm 46 is then mounted to a first pivot 48.

In the preferred embodiment, the one or more pieces of attached equipment may be one or more monitors, and the monitors are preferably flat screen monitors. These monitors would communicate with supporting equipment mounted on the one or more shelves 14.

The extendable arm 12 in the present embodiment has a long arm 50 and two short arms 52, 54, connected together by means of second pivot 56, third pivot 58 and fourth pivot 60 to a top of a vertical column 62. As shown therein, each arm consists of a pair of parallel rods. Other arm arrangements are clearly possible as well as other means of mounting the attached equipment. Several considerations are important in this regard are the weight of the attached equipment and the length of the extendable arm. In the present embodiment, a weight limit of less than about 50 pounds is considered as well as an extended limit of about 9 feet. As shown, the arm 12 has two degrees of freedom of movement, but to provide additional flexibility in the placement of the attached equipment, a third degree of freedom of movement is provided in the vertical direction in the present invention.

Figure 3:
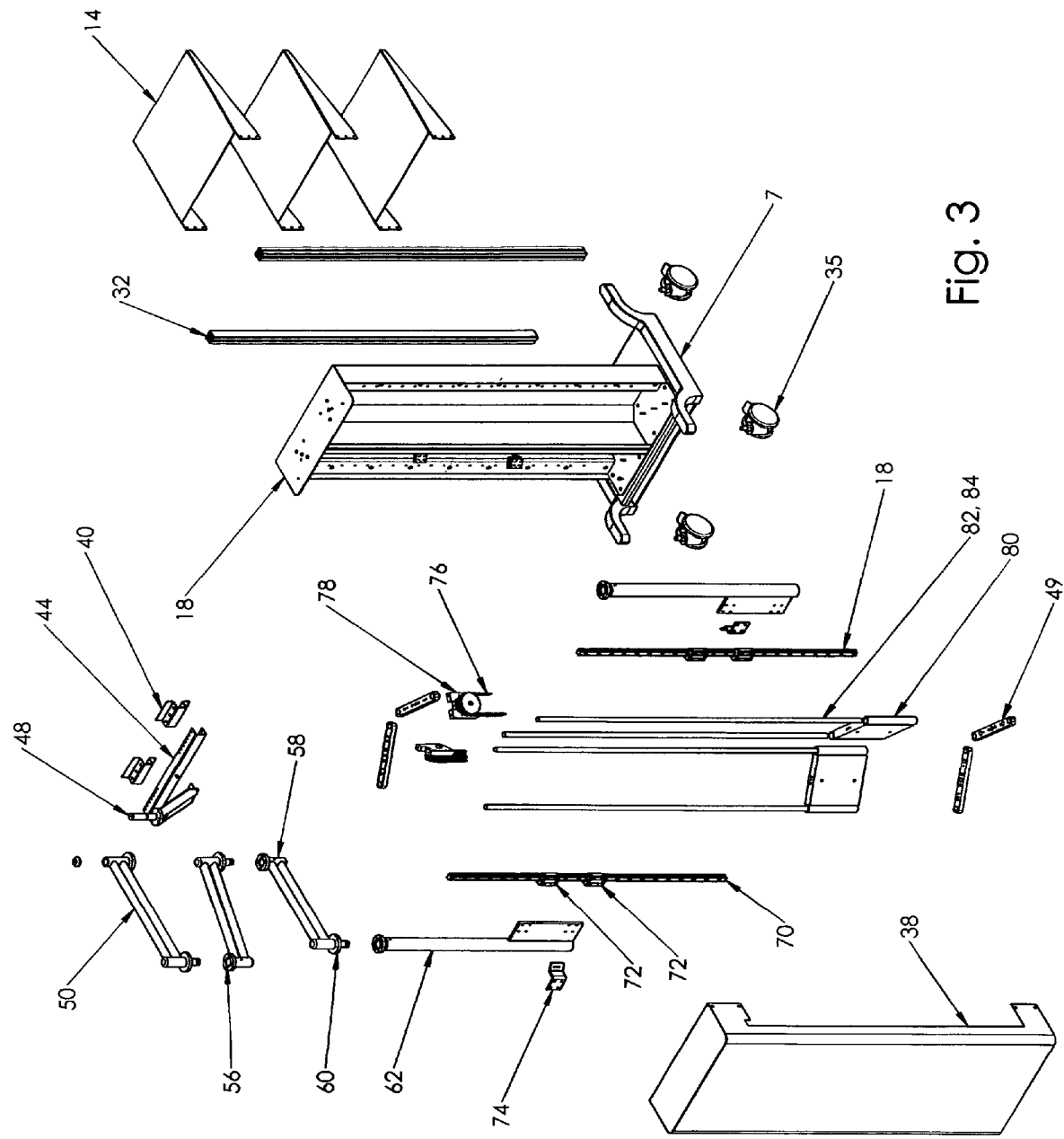
FIG. 3 is an exploded illustration of the mobile support cart showing the components thereof of the present invention.

The arm 12 is moved in the vertical direction by means the linear rail and counterweight system 22 providing neutral buoyancy 64, shown in FIGS. 3, 4 and 5. System 22 is designed so that once positioned, the attached equipment will remain in that position until moved by hand. The system 22 comprises the vertical column 62 where the short arm section 54 is pivotally mounted to the top of the vertical column 62, two columns are shown in the figures since two linear rail and counterweight systems 22 with neutral buoyancy 64 are included in the upper frame 18; a bearing rail bracket 66 is fixedly mounted to a bottom section 68 of the vertical column 62; one bearing rail 70, FIG. 3, with two rail carriages 72 are fixedly attached to the bearing rail bracket 66; the bearing rail 70 is attached to the upper frame 18. The rail carriages 72 translate along the rail 70 in the vertical direction; a pulley bracket 74 is attached to the bearing rail bracket 66 and to one end of a pair of pulley belts 76, as seen in FIG. 4 at the top left side; a pulley 78 is attached to the upper frame 18 with the pulley belts 76 attached thereon. The pulley belts 76 may be a chain belt, rubber belt, cloth belt or wire belt or a combination of such.

A counterweight 80 is attached to the other end of the pulley belts 76, FIGS. 3 and 4. The counterweight 80 slides upon one or more vertical shafts or rails 82, 84, being a second rail set, attached to the upper and the lower frames. The counterweight 80 is adjustable in weight to compensate for different weights of one or more pieces of attached equipment. Further, an amount of friction can be adjusted in the pulley and/or on the rail carriages to provide for a different neutral buoyancy 64 if different weights are required by different attached equipment weights. In the present embodiment, a vertical distance movable/translatable by the vertical column 62 ranges from about 2 to about 4 feet.

Since many modifications, variations, and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A mobile support system comprising:
   a cart, said cart having one or more arms, said one or more arms movable in two degrees of freedom being pivotally mounted, said one or more arms having means thereon capable of holding one or more pieces of attached equipment, said one or more arms are capable of extending a maximum distance of 9 feet from a cart body in a lateral direction, and said cart having a foot print for passing through doors with sides of about 2 by 4 feet;
   means for moving said one or more arms in a vertical direction to provide a third degree of freedom, wherein said means for moving said one or more arms in a vertical direction includes a linear rail and counterweight system for one or more arm for providing neutral buoyancy therein so that once positioned, said one or more arms remain in that position until moved by hand, wherein said linear rail and counterweight system comprises:

a vertical column, a short arm section pivotally mounted to a top of said vertical column, a bearing rail bracket, said bearing rail bracket fixedly mounted to a bottom section of said vertical column;

a rail carriage, said rail carriages fixedly attached to the bearing rail bracket;

a bearing rail, said bearing rail attached to an upper cart frame, said rail carriage riding upon said bearing rail;

a pulley bracket, said pulley bracket attached to said bearing rail bracket;

a pulley belt, said pulley belt attached to said pulley bracket;

a pulley, said pulley attached to said upper cart frame, said pulley belt attached thereon;

a counterweight, an other end of said pulley belt attached to said counterweight, said counterweight sliding upon one or more vertical shafts attached to the upper and a lower cart frame, said counterweight being adjustable in weight to compensate for different weights of one more pieces of attached equipment, said counterweight moving opposite to said vertical column to minimize the center of gravity above a floor;

wherein an amount of friction is adjustable in said liner rail and counterweight system to provide for adjustment of neutral buoyancy; and a plurality of adjustable shelves attached to said cart capable of holding supporting equipment for said attached equipment and communicating to said attached equipment.

2. The mobile support system as defined in claim 1, wherein said attached equipment is one or more monitors, said one or more monitors being flat screen monitors.

* * * * *